United States Patent
Wu

(10) Patent No.: US 8,564,872 B2
(45) Date of Patent: Oct. 22, 2013

(54) MICROSTRUCTURE OPTICAL PHASE SHIFTING FILM AND LENS

(75) Inventor: Jung-Tsung Wu, Tainan (TW)

(73) Assignee: Futis International Ltd., Tainan (TW)

( * ) Notice: Subject to any disclaimer, the term of this patent is extended or adjusted under 35 U.S.C. 154(b) by 0 days.

(21) Appl. No.: 13/407,988

(22) Filed: Feb. 29, 2012

(65) Prior Publication Data
US 2012/0224250 A1 Sep. 6, 2012

(30) Foreign Application Priority Data

Mar. 3, 2011 (TW) .............................. 100107137 A

(51) Int. Cl.
*G02F 1/01* (2006.01)

(52) U.S. Cl.
USPC .......................................... 359/279; 359/619

(58) Field of Classification Search
USPC .......... 359/237–324, 738, 455, 463, 619–628
See application file for complete search history.

(56) References Cited

U.S. PATENT DOCUMENTS

2007/0031140 A1* 2/2007 Biernath et al. .............. 396/268

* cited by examiner

*Primary Examiner* — Darryl J Collins
*Assistant Examiner* — Gary O'Neill
(74) *Attorney, Agent, or Firm* — Chih Feng Yeh; Huntington IP Consulting Co., Ltd.

(57) ABSTRACT

The present invention discloses a microstructure optical phase shifting film and lens. The optical phase shifting film is an integrated structure which includes a light-phase-shifting-film base and the convex surface positioned thereon. The convex surface has a plurality of semi-cylinder like protrusions which have the same height and are separated from a constant pitch with each other. A lens layer is covered on the surface of the optical phase shifting film to form a microstructure lens. The optical phase shift film exhibits different refractive index because of the light with different polarization angle. Therefore, the microstructure functions as a lenticular lens used in 2D/3D switching display.

11 Claims, 5 Drawing Sheets

US 8,564,872 B2

MICROSTRUCTURE OPTICAL PHASE SHIFTING FILM AND LENS

FIELD OF THE INVENTION

The present invention is relative to a monocoque microstructure optical phase shifting film and a microstructure cylindrical lens, and especially to the microstructure optical phase shifting film for 2D/3D display switching.

BACKGROUND OF THE INVENTION

The 3D display technique is regarded as the product of the new generation. Although the hardware technique of the glasses base 3D display is well-developed and can satisfy the demand for multiple people to watch the same displayer, to wear the glasses when watching the displayer is still a obstruction. Therefore, many manufactures do efforts on researching the 3D display technique that can work without wearing the glasses. Therefore, the bare eye 3D display technique is the mainstream of the future. Today, the bare eye 3D display technique has achieved the multi-view display for multiple people to watch simultaneously.

But the bare eye multi-view 3D displayer may display the vague text and cause the reading problems. Therefore, the hardware of the 3D displayer has to automatically detect the text/image and their display area in order to display the image in 3D mode and display the text in the traditional 2D mode while partially switching between the 2D and 3D modes in real-time.

The optical controlling technique of the switchable 3D display of the flat television includes the barrier technique of FIG. 1a and the lenticular lens of FIG. 1b. The basic theory is to divide the image into the pixel 111 for the right eye and pixel 112 for the left eye 112. In the parallax barrier technique, the parallax barrier is used to shield the right eye 101 from the pixel 111 for the left eye 102, and shield the left eye 102 from the pixel 112 for the right eye 101. Therefore, the right eye 101 and the left eye 102 can see images with different optical phases and, thus render the 3D image. The lenticular lens technique uses the refractive property of the lenticular lens 130 to refract pixel 112 for the right eye 101 and pixel 111 for the left eye 102 to the right eye 101 and the left eye 102, respectively. In the traditional technique, the lenticular lens possesses the better lightness, but its manufacture is not as stable or mature as the parallax barrier, and thus the parallax barrier takes the advantage of the cost. However, the above-mentioned two techniques merely display the fixed 3D images and fail to switch dynamically between 2D/3D images.

FIGS. 2a and 2b show the traditional technique for dynamically switching between 2D/3D images. The technique possesses: a switching layer 220 for changing the polarization angle of the light by applying the polarization electrical voltage on the polarization film 210 over/under the switching layer 220; a crystal layer 240 for change its refraction index by controlling the electrical voltage; and a lens layer 250 having a fixed refraction index n. By referring to FIG. 2a, when the polarization voltage Vs 271 is applied to the polarization film 210 over/under the switching crystal layer 220, the orientation of the molecules of the crystal is changed in order to make the light 280 with 0 degree polarization orientation, which is incident into the switching crystal layer 220 through pixel 201, becomes the light 281 with 90 degree polarization orientation. Among them, the refraction index of the crystal layer 240 is controlled as N, which is different from the refraction index n of the lens layer 250, and thus the forwarding direction of the light is changed to achieve the effect of the lenticular lens and the 3D mode. By referring to FIG. 2b, when the polarization voltage Vb 272 is applied to the polarization film 210 over/under the switching crystal layer 220, the orientation of molecules of the crystal is changed in order to make the light 280 with 0 degree polarization orientation, which is incident into the switching crystal layer 220, is still the light 280 with 0 degree polarization orientation. However, the refraction index of the crystal layer 240 is controlled as n, which is the same as the refraction index n of the lens layer 250, and thus the forwarding direction of the light is not changed, i.e., the 2D mode.

However, the traditional technique possesses many disadvantages. For example, the crystal layer 240 and the lens layer 250 have to be formed on a glass substrate 230, and require a glass substrate 260 covered thereon. And, the crystal layer 240 has to be controlled by the electrical voltage or other method to change its refraction index to cooperate with the lens layer 250 to achieve the function of switching between 2D/3D.

The invention possesses many advantages. For example, the invention can save the glass substrate, and does not need to control the crystal lens to change the refraction index. Moreover, the lens film of the invention is moncoque, and reduces the cost of manufacturing.

SUMMARY OF THE INVENTION

The invention discloses a microstructure optical phase shifting film and lens. The microstructure optical phase shifting film comprises a convex surface positioned on the light-phase-shifting-film base, wherein the convex surface has a plurality of semi-cylinder like protrusions with equal heights arrayed in a constant pitch and parallel to each other, a height is formed between a highest point and a base point of the semi-cylinder like protrusions and axis of the semi-cylinder like protrusions and an alignment phase of material molecules of the microstructure optical phase shifting film form an angle.

The material of the optical phase shifting film is the transparent material comprising: polyvinyl chloride (PVC), polycarbonate (PC), polyvinyl alcohol (PVA), polyethylene terephthalate (PET), polyethylene (PE), tri-acetyl cellulose (TAC), cellulose Acetate Propionate (CAP). The thickness of the light-phase-shifting-film base is 50 µm~150 µm, the constant pitch is 120 µm~450 µm, and the height is 10 µm~180 µm. Factors used to change to refraction index of the microstructure optical phase shifting film comprising: the angle, the height of the semi-cylinder like protrusions, the constant pitch of the semi-cylinder like protrusions, or a polarization angle of an incident light.

The invention discloses a lens comprising the microstructure optical phase shifting film comprises a lens layer with a first refraction index on the semi-cylinder like protrusions, wherein an incident light with a polarization angle from a bottom flat surface of the light-phase-shifting-film base penetrates the microstructure optical phase shifting film and the lens layer. Wherein a first refraction index of the microstructure optical phase shifting film in a first polarization angle of the incident light is different from a second refraction index of the microstructure optical phase shifting film in a second polarization angle of the incident light.

In an embodiment, the first polarization angle comprises 0 or 180 degree and the second polarization angle comprises 90 or 270 degree. In another embodiment, the first polarization angle comprises 90 or 270 degree and the second polarization angle comprises 0 or 180 degree.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION OF THE PREFERRED EMBODIMENT

The embodiments and aspects of the present invention will be described to illustrate the structures and processes, which are the examples rather than the limitations for the claims of the present invention. Therefore, in addition to the preferred embodiments of the specification, the present invention can be widely applied in other embodiments.

The monocoque microstructure optical phase shifting film and lens of the invention possess many advantages over the traditional techniques. For example, the invention can save the glass substrate, and does not need to control the crystal lens to change the refraction index. Moreover, the lens film of the invention is monocoque, and the invention reduces the cost to produce the optical phase shifting film for switching between the 2D/3D images.

Figure 1A:
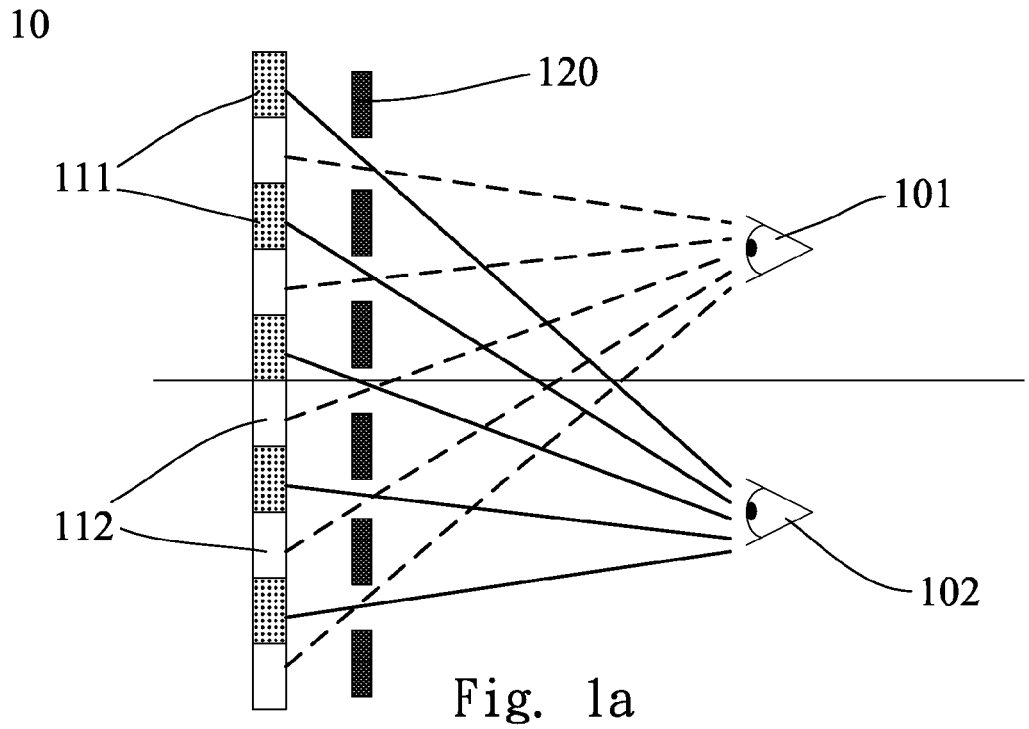
FIGS. 1a and 1b illustrate the prior art of the 3D image.
Figure 1B:
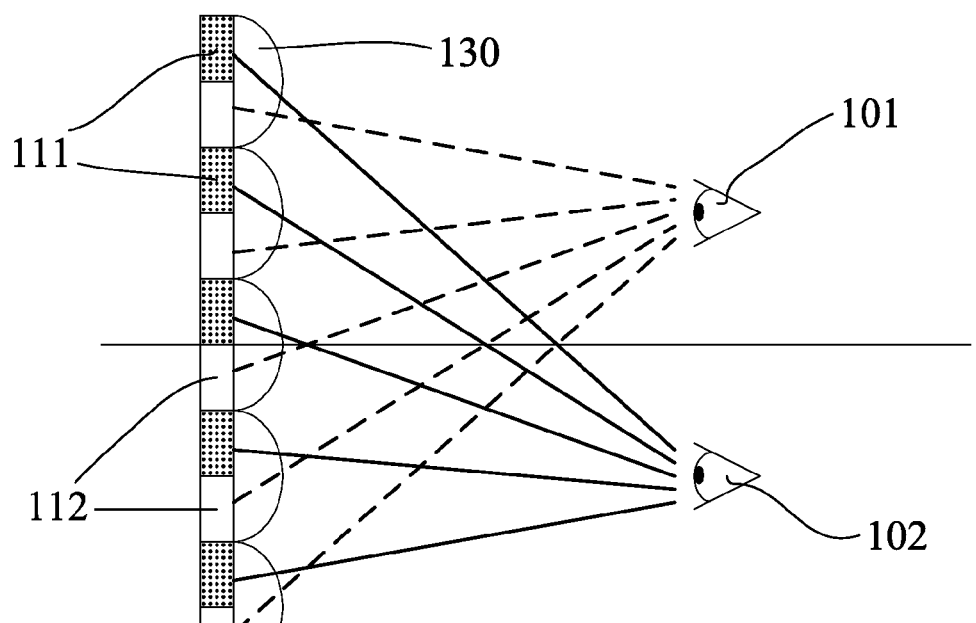
Figures 2A, 2B:
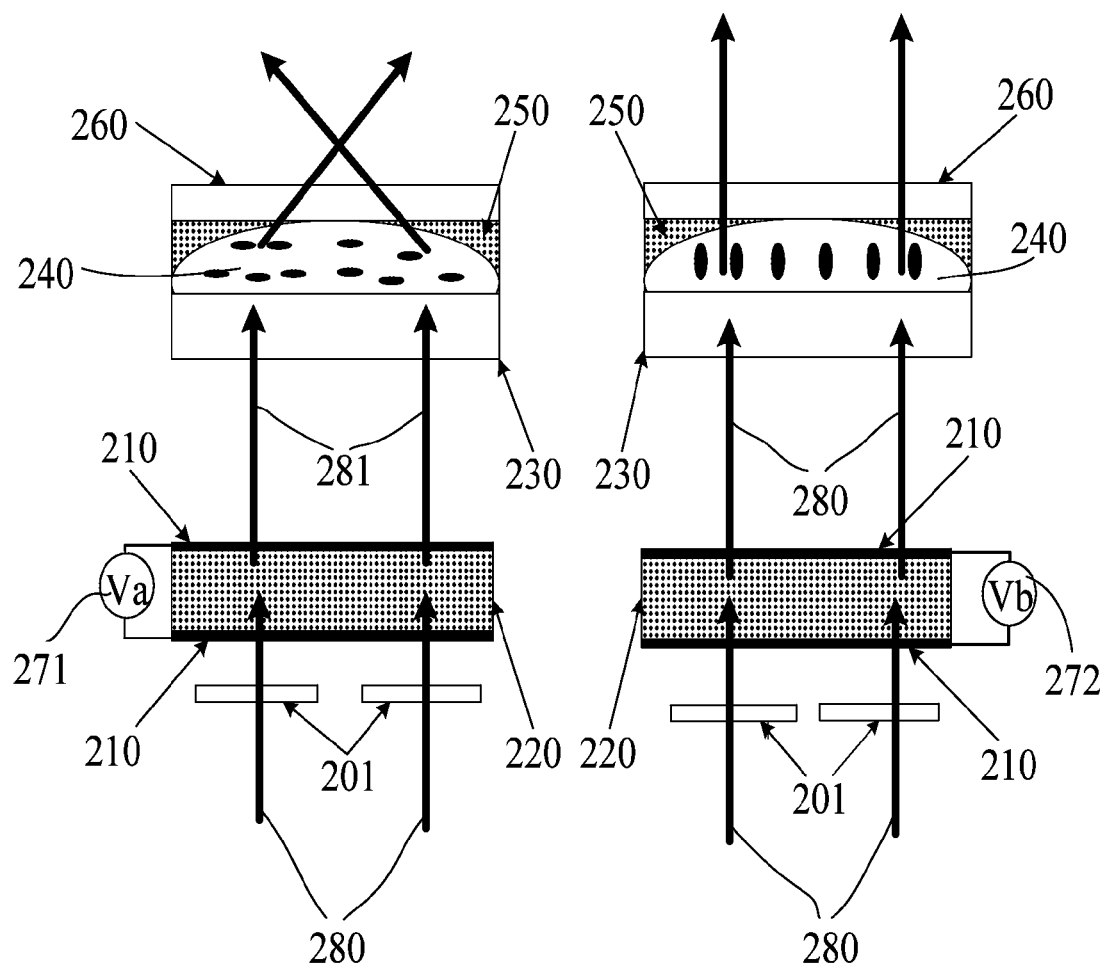
FIGS. 2a and 2b illustrate the prior art to switching between the 2D/3D images.
Figure 3A:
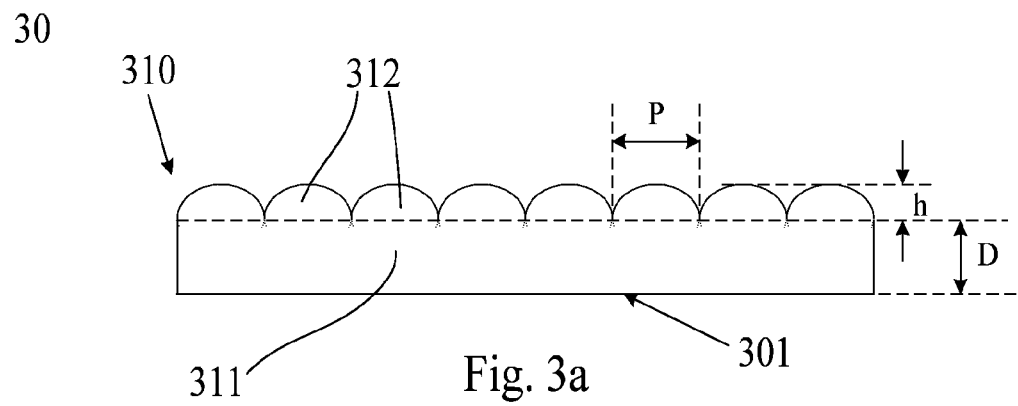
FIGS. 3a-3c illustrate an exemplary monocoque microstructure optical phase shifting film of the invention.
Figure 3B:
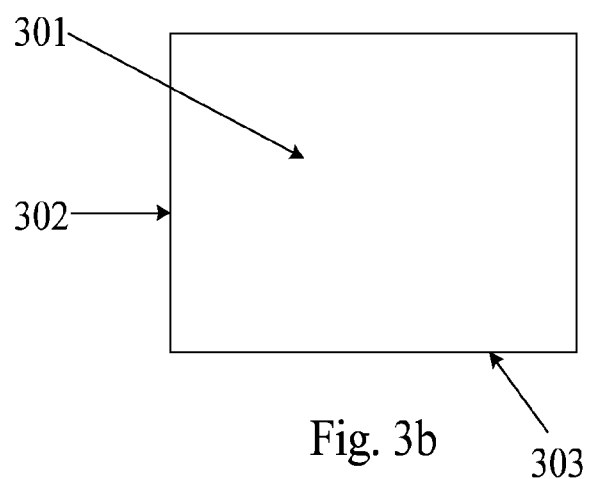

The cross-sectional view of the FIG. 3a shows the example microstructure optical phase shifting film 310 of the invention, wherein the optical phase shifting film 310 is monocoque. For the clarity the description, the optical phase shifting film 310 is divided into the optical-phase-shifting-film base 311 and the semi-cylinder like protrusions 312, wherein the bottom 301 of the optical-phase-shifting-film base 311 has a flat bottom surface. The thickness of the base of an embodiment is 50 μm~150 μm. FIG. 3b shows the bottom view of the bottom 301 of the invention. The bottom 301 is rectangular and the lengths of its longitudinal side 302 and its lateral side 303 can be designed on the basis of the applied plate. The semi-cylinder like protrusions 312 of the optical phase shifting film 310 are positioned in a pitch P, which is 150 μm~200 μm in an embodiment and 120 μm~450 μm in another embodiment. In the practice, the pitch P varies on the basis of the pitch between the pixels of the applied plate. The axis of the semi-cylinder like protrusions 312 can be designed as being parallel to the longitudinal side 302 and the lateral side 303.

The thickness D of the base of the optical phase shifting film 310 can be changed on the basis of the requirement, for example, the transparency, the yield rate, the flexibility, and the adhesion. The height h of the semi-cylinder like protrusions 312 is measured from their base point of the light-phase-shifting-film base 311 to the highest point of the semi-cylinder like protrusions 312. In an embodiment, the height h is, for example, 10 μm~180 μm. The height h of the semi-cylinder like protrusions 312 affects the curvature of the semi-cylinder like protrusions 312, and the height h can be changed to change the refraction index of the semi-cylinder like protrusions 312. Therefore, the height h is designed and can be changed on the basis of the requirement.

In an embodiment, the material of the optical phase shifting film 310 is the transparent material comprising: polyvinyl chloride (PVC), polycarbonate (PC), polyvinyl alcohol (PVA), polyethylene terephthalate (PET), polyethylene (PE), tri-acetyl cellulose (TAC), cellulose Acetate Propionate (CAP).

Figure 3C:
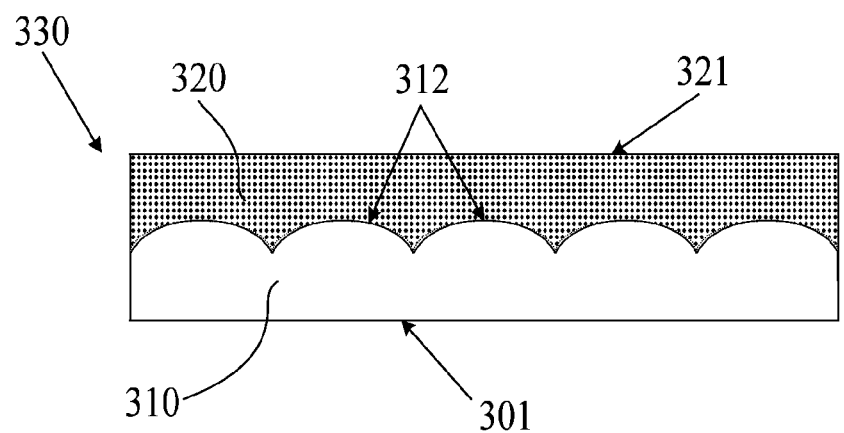

In an embodiment, as shown in the FIG. 3c, the lens layer 320 is covered on the surface of the semi-cylinder like protrusions 312 of the optical phase shifting film 310 to form a microstructure lens 330. The microstructure lens 330 is affixed to the plate of the displayer by the bottom 301 of the optical phase shifting film 310.

Figure 4:
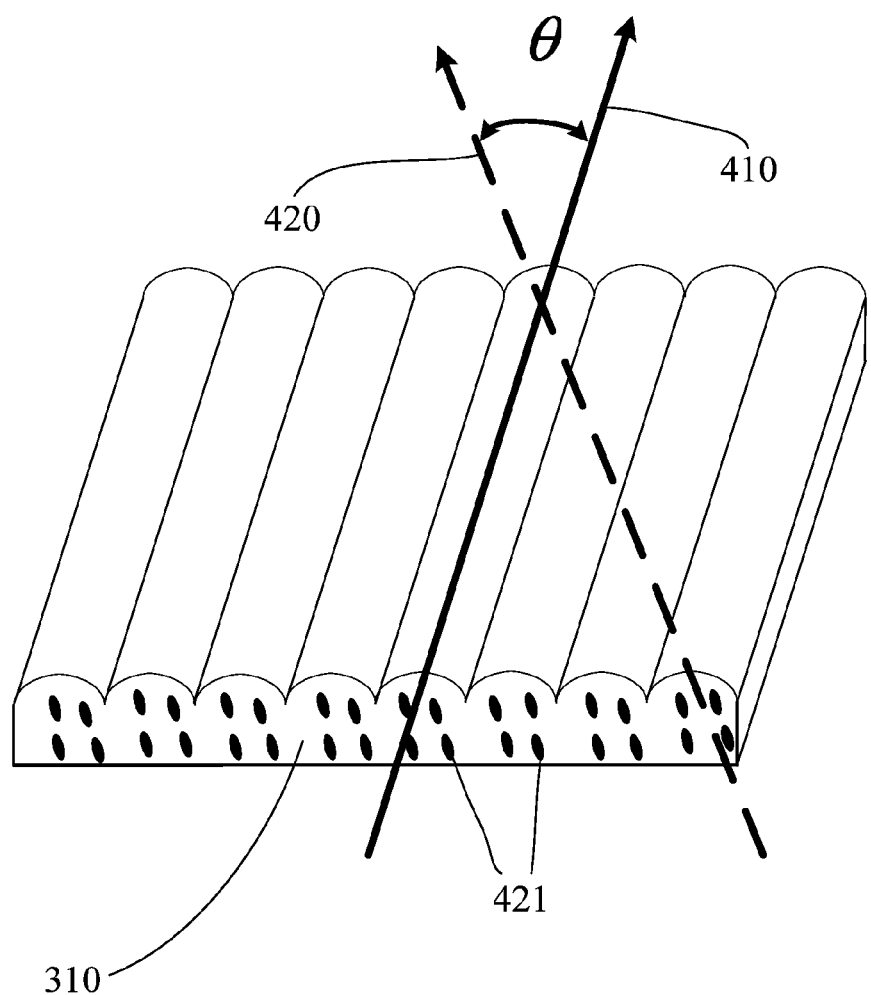
FIG. 4 shows the theory of the refraction of the optical phase shifting film of the invention.

FIG. 4 shows the theory of the refraction of the optical phase shifting film 310 in the invention. As shown, the material molecules 421 of the optical phase shifting film 310 are aligned in one orientation. The axis 410 of the semi-cylinder like protrusions of the optical phase shifting film and the phase axis 420 of the material molecules form an angle θ, which can be controlled to change the refraction index of the optical phase shifting film 310. In an embodiment, the refraction index of the optical phase shifting film 310 can be changed by adjusting the height h and the pitch of the semi-cylinder like protrusions 312 of optical phase shifting film 310.

Figure 5A:
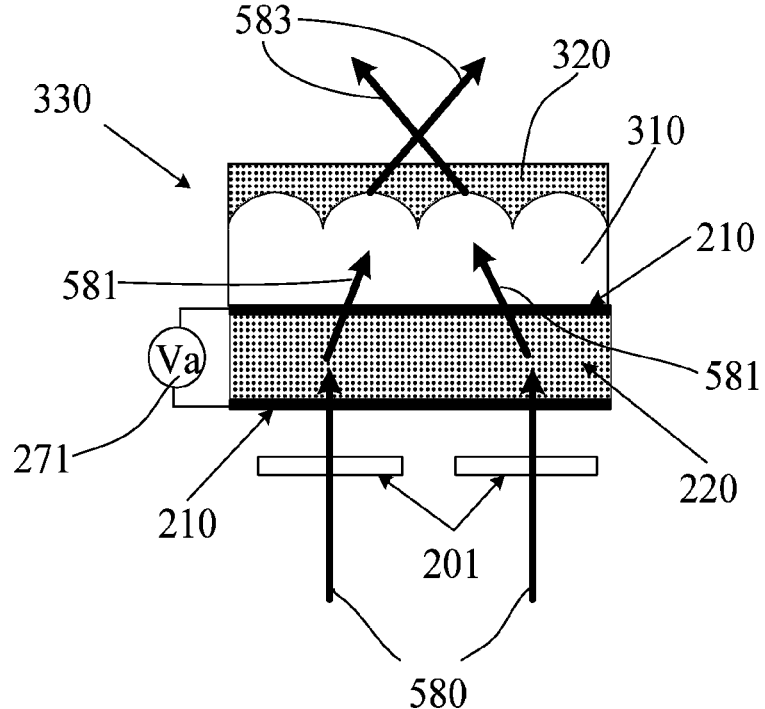
FIGS. 5a and 5b illustrates the exemplary application of the optical phase shifting film of the invention.
Figure 5B:
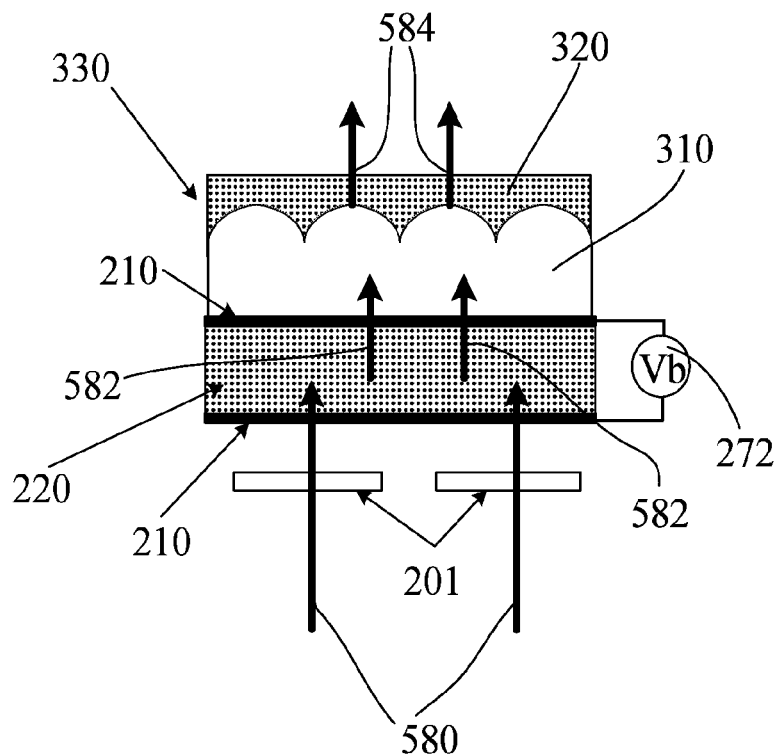

The following explains how the microstructure lens 330 is applied to the display plate to achieve the function to switch between 2D/3D. FIGS. 5a and 5b show the microstructure lens 330 of the invention, which is applied on the display with a switching layer 220, wherein the bottom 301 of the optical phase shifting film 310 is affixed to the switching layer 220. In FIG. 5a, when the polarization voltage Va 271 is applied to the polarization film 210 over/under the switching crystal layer 220, the orientation of the molecules of the crystal is changed in order to make the light 580 with 0 degree polarization orientation, which is incident into the switching crystal layer 220 through pixel 201, become the incident light 581 with 90 or 270 degree polarization orientation. Among them, the refraction index of the crystal layer 240 is N, which is different from the refraction index n of the lens layer 320, and thus the forwarding direction 583 of the light is changed to achieve the effect of the lenticular lens and the 3D mode. In another embodiment, when the polarization voltage Va 271 is applied to the polarization film 210 over/under the switching crystal layer 220, the orientation of the molecules of the crystal is changed in order to make the light 580 with 0 degree polarization orientation, which is incident into the switching crystal layer 220 through pixel 201, become the light with 0 or 180 degree polarization orientation (not shown). Among them, the refraction index of the optical phase shifting film 310 is N, which is different from the refraction index n of the lens layer 320, and thus the forwarding direction of the light is changed to achieve the effect of the lenticular lens and the 3D mode.

In FIG. 5b, when the polarization voltage Vb 272 is applied to the polarization film 210 over/under the switching crystal layer 220, the orientation of the molecules of the crystal is changed in order to make the light 580 with 0 degree polarization orientation, which is incident into the switching crystal layer 220 through pixel 201, become the incident light 582 with 0 or 180 degree polarization orientation. Among them, the refraction index of the optical phase shifting film 310 is n, which is the same as the refraction index n of the lens layer 320, and thus the forwarding direction of the light is not changed, i.e., the 2D mode. In another embodiment, when the polarization voltage Vb 272 is applied to the polarization film 210 over/under the switching crystal layer 220, the orientation of the molecules of the crystal is changed in order to make the light 580 with 0 degree polarization orientation, which is incident into the switching crystal layer 220 through pixel 201, become the incident light (not shown) with 90 or 270 degree polarization orientation. Among them, the refraction index of the optical phase shifting film 310 is n, which is the same as the refraction index n of the lens layer 320, and thus the forwarding direction of the light is not changed, i.e., the 2D mode.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A microstructure optical phase shifting film for switching between 2D and 3D display, which is monocoque, comprising:
   a switching crystal layer including molecules of crystal with polarization films over and under the switching crystal layer wherein orientation of the molecules of the crystal is changed when a polarization voltage is applied to the polarization films;
   a light-phase-shifting-film base with a thickness and a rectangular shape of the top view, wherein the light-phase-shifting-film base is positioned on the switching crystal layer, and has two lateral sides with equal lengths and two longitudinal sides with equal lengths;
   a convex surface positioned on the light-phase-shifting-film base with a plurality of semi-cylinder like protrusions with equal heights arrayed in a constant pitch and parallel to each other, wherein the heights are measured from highest points of the semi-cylinder like protrusions to points where the semi-cylinder like protrusions intersect the light-phase-shifting-film base, and an axis of the semi-cylinder like protrusions and an alignment phase of material molecules of the microstructure optical phase shifting film form an angle.

2. The microstructure optical phase shifting film of claim 1, wherein factors used to change to refraction index of the microstructure optical phase shifting film comprising: the angle, the height of the semi-cylinder like protrusions, the constant pitch of the semi-cylinder like protrusions, or a polarization angle of an incident light.

3. The microstructure optical phase shifting film of claim 1, wherein the constant pitch of the semi-cylinder like protrusions is 120 μm~450 μm.

4. The microstructure optical phase shifting film of claim 1, wherein the constant pitch of the semi-cylinder like protrusions is 150 μm~200 μm.

5. The microstructure optical phase shifting film of claim 1, wherein the height of the semi-cylinder like protrusions is 10 μm~180 μm.

6. The microstructure optical phase shifting film of claim 1, wherein the thickness of the light-phase-shifting-film base is 50 μm~150 μm.

7. The microstructure optical phase shifting film of claim 1, wherein the material of the microstructure optical phase shifting film is transparent material comprising: polyvinyl chloride (PVC), polycarbonate (PC), polyvinyl alcohol (PVA), polyethylene terephthalate (PET), polyethylene (PE), triacetyl cellulose (TAC), cellulose Acetate Propionate (CAP).

8. A lens comprising the microstructure optical phase shifting film of claim 1, further comprising a lens layer with a first refraction index on the semi-cylinder like protrusions, wherein an incident light with a polarization angle from a bottom flat surface of the light-phase-shifting-film base penetrates the microstructure optical phase shifting film and the lens layer.

9. The lens of claim 8, wherein a first refraction index of the microstructure optical phase shifting film in a first polarization angle of the incident light is different from a second refraction index of the microstructure optical phase shifting film in a second polarization angle of the incident light.

10. The lens of claim 9, wherein the first polarization angle comprises 0 or 180 degree and the second polarization angle comprises 90 or 270 degree.

11. The lens of claim 9, wherein the first polarization angle comprises 90 or 270 degree and the second polarization angle comprises 0 or 180 degree.

\* \* \* \* \*